US012527991B2

United States Patent
Wazan et al.

(10) Patent No.: US 12,527,991 B2
(45) Date of Patent: Jan. 20, 2026

(54) PHYSICAL TRAINING SYSTEM WITH MACHINE LEARNING-BASED TRAINING PROGRAMS

(71) Applicant: MONSTER SMART SOLUTIONS, LLC, Charlotte, NC (US)

(72) Inventors: Sam Wazan, Charlotte, NC (US); Matthew Gynn Eller, Huntersville, NC (US); Rafael Garcia Secundo, Charlotte, NC (US); Kathryn E. Yovanovich, Matthews, NC (US)

(73) Assignee: MONSTER SMART SOLUTIONS, LLC, Charlotte, NC (US)

( * ) Notice: Subject to any disclaimer, the term of this patent is extended or adjusted under 35 U.S.C. 154(b) by 538 days.

(21) Appl. No.: 17/628,923

(22) PCT Filed: Jul. 23, 2020

(86) PCT No.: PCT/US2020/043212
§ 371 (c)(1),
(2) Date: Jan. 21, 2022

(87) PCT Pub. No.: WO2021/016426
PCT Pub. Date: Jan. 28, 2021

(65) Prior Publication Data
US 2022/0249911 A1  Aug. 11, 2022

Related U.S. Application Data

(60) Provisional application No. 62/877,594, filed on Jul. 23, 2019.

(51) Int. Cl.
*A63B 24/00* (2006.01)
*A63B 21/005* (2006.01)
(Continued)

(52) U.S. Cl.
CPC ...... *A63B 24/0087* (2013.01); *A63B 21/0058* (2013.01); *A63B 24/0062* (2013.01);
(Continued)

(58) Field of Classification Search
CPC ............ A63B 24/0087; A63B 21/0058; A63B 24/0062; A63B 24/0075;
(Continued)

(56) References Cited

U.S. PATENT DOCUMENTS

| 2007/0142178 A1 | 6/2007 | Harney et al. |
| 2016/0196758 A1* | 7/2016 | Causevic ............... A61B 5/165 434/236 |

(Continued)

FOREIGN PATENT DOCUMENTS

| JP | 2019058285 A | 4/2019 |
| JP | 2019520165 A | 7/2019 |
| WO | 2019087196 A1 | 5/2019 |

OTHER PUBLICATIONS

Monster Smart Solutions, LLC, International Patent Application No. PCT/US2020/043212, International Search Report, Oct. 16, 2020.
(Continued)

*Primary Examiner* — Robert P Bullington
(74) *Attorney, Agent, or Firm* — Moore & Van Allen PLLC; R. W. McCord Rayburn

(57) ABSTRACT

An athletic training system includes an athlete data repository, an adaptive algorithm, and at least one training unit. The athlete data repository includes biometric and performance data of athletes. The adaptive algorithm has access to the athlete data repository and is trained on biometric and performance data to generate athlete-specific training programs for use with the training unit. Each athlete-specific training program is adapted to biometric and performance
(Continued)

data of an individual athlete. The training unit includes electronically adjustable athletic resistance equipment and a controller. The controller is configured to receive at least one athlete-specific training program of the plurality of athlete-specific training programs and to adjust resistance levels of the adjustable resistance equipment in response to the received athlete-specific training program. The controller is also configured to record performance data of an athlete's use of the training unit in accordance with the received athlete-specific training program.

18 Claims, 8 Drawing Sheets

(51) Int. Cl.
    *G16H 20/30*     (2018.01)
    *G06N 20/00*     (2019.01)
(52) U.S. Cl.
    CPC ......... *A63B 24/0075* (2013.01); *G16H 20/30* (2018.01); *A63B 2024/0071* (2013.01); *A63B 2024/0093* (2013.01); *A63B 2220/833* (2013.01); *G06N 20/00* (2019.01)

(58) Field of Classification Search
    CPC .... A63B 2024/0071; A63B 2024/0093; A63B 2220/833; G16H 20/30; G06N 20/00
    See application file for complete search history.

(56) References Cited

U.S. PATENT DOCUMENTS

| | | |
|---|---|---|
| 2017/0266501 A1 | 9/2017 | Sanders et al. |
| 2017/0368413 A1 | 12/2017 | Shavit |
| 2018/0001181 A1* | 1/2018 | von Prellwitz .... A63B 24/0075 |

OTHER PUBLICATIONS

Monster Smart Solutions, LLC, International Patent Application No. PCT/US2020/043212, Written Opinion, Oct. 16, 2020.
Monster Smart Solutions, LLC, European Patent Application No. 20844080.0, Extended European Search Report, Jul. 20, 2023.
Monster Smart Solutions, LLC, Japanese Patent Application No. 2022-505234, Office Action, Apr. 9, 2024.

* cited by examiner

PHYSICAL TRAINING SYSTEM WITH MACHINE LEARNING-BASED TRAINING PROGRAMS

RELATED APPLICATIONS

This application is a National Stage Patent Application (filed under 35 § U.S.C. 371) of PCT/US2020/043212 filed Jul. 23, 2020 of the same title, which is a Continuation in Part of U.S. Provisional Patent Application Ser. No. 62/877,594, filed Jul. 23, 2019 entitled "GUARANTEED-GAINS TRAINING SYSTEM", the contents of each of which are hereby incorporated by reference.

FIELD OF THE INVENTION

The present invention relates generally to athletic training systems and methods, and more particularly to systems, methods, apparatuses, and computer program products adapted to provide sport-specific, where applicable position specific and athlete-specific training and performance improvement programs.

BACKGROUND

Known athletic training units require a user, athlete, coach, or trainer to determine resistance provided by weights, bungee cords, hydraulic fluid or air-compressed resistance and to adjust the resistance for athletic training. Coaches, athletes, and trainers use their personal expertise and various non sport-specific drills to provide training routines. Athletes then receive programs that include routines and drills subject to the unquantifiable interpretation of the athlete's strengths and tacit knowledge by so-called experts. Athletes begin often begin training without establishing the baseline measures in the areas of Verticality, Agility, Speed, and Horizontality. Coaches and trainers often train athletes based on their prior experience without establishing baseline measures for athletes in those four areas. Athletic gains in the four areas become subjective because the observed improvements cannot be verified with previously established metrics.

Generalized training programs may be produced to athletes by coaches and trainers because these routines have been optimized to provide a one-size-fits-all training program. Athletic improvements or gains, resulting from these programs are unpredictable, random, therefore, not guaranteed, wince they are not necessarily individualized to a specific athlete's measured and verified biological and biometric profile and athletic abilities or goals. Creating an individualized plan for an athlete is time consuming, costly, and inefficient for many coaches and trainers. Moreover, coaches and trainers are unable to access, therefore, extrapolate data for an individualized training by utilizing the availability of massive data from athletes at large.

Although athletes may achieve gains through traditional training programs, they do not necessarily achieve gains that fit each specific need. For example, an athlete who plays field hockey may wish to increase their speed. This athlete signs up to take a "Leap and Burst" training program with a specialized training center such as Monster Vertical Power, and achieves gains in all four of the VASH areas (verticality, agility, speed, horizontality). However, the athlete does not care much about verticality since it does not affect their performance as a field hockey player much. In this case, a coach would have to spend hours to produce training program specifically for this athlete. Obviously, it is not possible to do this for thousands and millions of athletes without automation utilizing the latest enabling technologies in Machine Learning and Artificial Intelligence.

Additionally, canned training programs by coaches and trainers in clubs, schools, universities, specialty fitness centers currently do not have a way to optimally calibrate resistance to an athlete. Athletes are individualized a resistance according to the training program they are currently taking, but if resistance is too much or too little, the resistance level must be manually adjusted. This must be done for each athlete and can still be an imprecise process even with a coach manually tuning resistance for each athlete, because they rely on trial and error.

Similarly, the accessories used to extract resistance on an athlete while performing drills should be optimized based on athlete's age, height, weight, gender, grip and hand size, waist and seam measures, etc. but this is difficult to do for each individual athlete. Coaches tweak and manually optimize accessories for individual athletes relying on trial and error. A scientific and mathematical approach to optimizing drills, sequence of resisted and none-resisted drills, rest time, and accessories to meet each athlete's specific goals and needs would greatly improve both the outcome of the training process and allow for more athletes to train in any given time period.

SUMMARY

An athletic training system includes an athlete data repository, adaptive algorithms, and at least one training unit. The athlete data repository includes biometric and performance data of athletes. The adaptive algorithm has access to the athlete data repository and is trained on biometric and performance data of the type stored in the athlete data repository to generate a plurality of athlete-specific training programs for use with training units. Each athlete-specific training program is adapted to biometric and performance data of an individual athlete.

The training unit includes electronically adjustable athletic resistance equipment and a controller. The controller is configured to receive at least one athlete-specific training program of the plurality of athlete-specific training programs and to adjust resistance levels of the adjustable resistance equipment in response to the received athlete-specific training program. The controller is also configured to record performance data of an athlete's use of the training unit in accordance with the received athlete-specific training program. The adaptive algorithm accesses biometric information and performance data of the individual athlete to generate an athlete-specific training program for that athlete.

The training unit may further comprises an interface for at least one mobile device of a user, wherein the mobile device receives the athlete-specific training program from the adaptive algorithm and communicates the athlete-specific training program to the training unit. The mobile device may receive the performance data recorded by the controller and communicate the performance data to the adaptive algorithm. The adaptive algorithm may communicate the recorded performance data to the athlete data repository.

In some embodiments, the adaptive algorithm comprises a plurality of adaptive algorithms. For example, the adaptive algorithm may comprise a plurality of Machine Learning models. The plurality of Machine Learning models may comprise an evaluation prediction model which receives as input biometric data for a given athlete and performance data of other athletes and generates an evaluation training program. The plurality of Machine Learning models may further comprise a drill routine model which receives as input performance data recorded by the controller during use of the evaluation training program. The drill routine model may also receive as input the performance data performance data recorded by the controller during use of an athlete-specific training program previously generated by the drill routine model.

In some embodiments, the training unit includes a vertical jump station, a horizontal-agility-speed station, or both. In some embodiments, the training unit further includes a plurality of vertical jump stations and a plurality of horizontal-agility-speed stations. The training unit may further comprise an electric motor responsive to the controller to adjust the resistance levels of the adjustable equipment.

A computer-implemented method of generating an athlete-specific training program adapted to an individual athlete is also provided. The method includes, in a first step, storing biometric and performance data of the individual athlete and additional athletes having comparable biometric and performance data in an athlete data repository. In a second step, the individual athlete accesses a training unit. The training unit includes electronically adjustable athletic resistance equipment and a controller, the controller being configured to receive an athlete-specific training program of the plurality of athlete-specific training programs, to adjust resistance levels of the adjustable resistance equipment in response to an athlete-specific training program, and to record performance data of an athlete's use of the training unit in accordance with the athlete-specific training program.

A third step is providing an adaptive algorithm with an identifier for the individual athlete and an identifier for the training unit being accessed. The adaptive algorithm has been trained on biometric and performance data of the type stored in the athlete data repository to generate a plurality of athlete-specific training programs for use with training units. In a fourth step, the adaptive algorithm accesses the athlete data repository and generates at least one athlete-specific training program adapted to biometric and performance data of the individual athlete. In a fifth step, the athlete-specific training program is provided to the training unit.

The training unit further may further comprise an interface for at least one mobile device of a user. In this case, the step of accessing the training unit comprises the individual athlete coupling a mobile device to the training unit. The step of providing the athlete-specific training program to the training unit may further comprise the step of the mobile device receiving the athlete-specific training program from the adaptive algorithm and communicating the athlete-specific training program to the training unit.

The method may further comprising the steps of the mobile device receiving the performance data recorded by the controller and communicating the performance data to the adaptive algorithm.

The adaptive algorithm may comprise a plurality of adaptive algorithms, such as a plurality of trained Machine Learning models. The adaptive algorithm accesses biometric information and/or performance data of the individual athlete to generate an athlete-specific training program for that athlete.

The present invention comprises an adaptive athletic training system including hardware and software adapted to enhance gains in at least four athletic areas, including Verticality, Speed, and Horizontality. The adaptive athletic training system includes a sport training unit comprising several stations, with each station able to accommodate one athlete at a time, allowing multiple athletes to train, concurrently. Some stations contain jump boards to train in in at least verticality, while the remaining stations to train at least the three other areas: Horizontality, Agility, and Speed. The concepts discussed herein are not limited to these areas but may be extended to general fitness goals and training for other physical attributes such as endurance. Attached to each station is an athlete-performance based resistance component for athlete designed personalized training routines and drills. The sport training unit may include rechargeable batteries and cradles to mount several interfacing IoT devices. The sport training unit may connect to a database via Bluetooth or internet to store data collected by the sport training unit then used by Artificial Intelligence (AI), Machine Learning (ML), or other computer software to adapt training for each individual athlete by sport. The sport training unit maybe water resistant.

The sport training unit may include various sensors and such accelerometers, proximeters, gyroscope, ultrasonic, LiDar, and camera, computer software, database, mobile applications and recommends a training program individualized specifically to the athlete's sports and positions. The adaptive athletic training system may access and measure biological and sport specific performance tests to customize an athlete-based unique training program for the athlete to realize athletic gains in a sport. The sport training unit captures Biological Information such as age, height, gender, ethnicity, sport, position in the sport, body mass index, weight, oxygen level, height, wing span and standing reach to generate athlete and sport-specific training regimens and measures to improve athlete performance.

DETAILED DESCRIPTION

Figure 1:
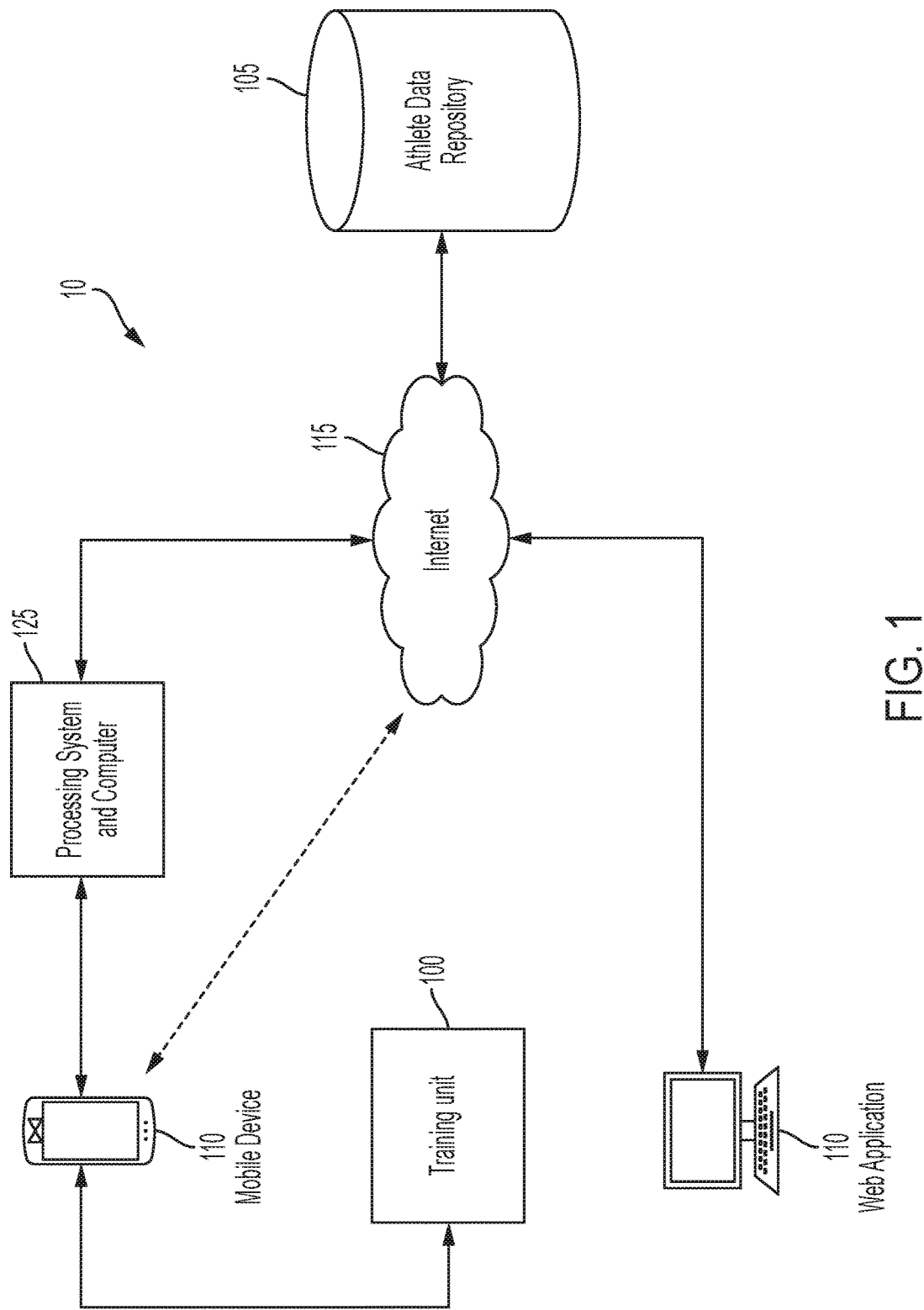
FIG. 1 depicts the connectivity of mobile devices, the training unit, and the athlete data repository in accordance with an example embodiment.

An exemplary embodiment of the adaptive athletic training system 10 comprises at least one athletic training unit 100, an athlete data repository 105, and processing system 125 that accesses the data repository and generates sport and athlete specific training programs, and at least one mobile device 110, A mobile app is installed on the mobile device 10 to communicate with the training unit 100 and compute software 125.

An example of connectivity of Internet of Things ("IoT") devices, the sport training unit, and the athlete data repository are illustrated in FIG. 1. A user connects their mobile device 110 to the training unit 100 via Bluetooth, Wi-fi internet, cable, or other means of digital communication. Data collected by the training unit for that user is sent to the user's mobile device. Any metadata input by the user to their mobile app is also collected. The mobile app sends the data to computer software 125, which stores it in the athlete data repository 105. While FIG. 1 illustrates certain data paths as an example, the inventor is not so limited. Persons of skill in the art would readily understand that the mobile device 110 and training unit 100 illustrated in FIG. 1 may communicate directly with the data repository 105 over the internet 115.

When the user wants to complete another workout, they connect their mobile device to the training unit. The mobile device then uses the computer software and processing system 125 data from the athlete data repository to create a training program individualized to the athlete's needs for the current session. The mobile device may provide an athlete and a training unit identifier. In some embodiments, the computer software 125 comprises at least one trained adaptive algorithm, such a one or more Machine Learning models or other suitable Artificial Intelligence technology. The computer software 125 may use data from the current user and other users as a training set. Any data collected by the training unit after each workout is collected and sent to the database, to monitor training effort, duration of training sessions, and measure gains made by the user. Data, progress, gains, and other metrics from the athlete data repository may be accessed through a web application 120 via the internet 115. However, the web application may not interface with the training unit.

Figure 2:
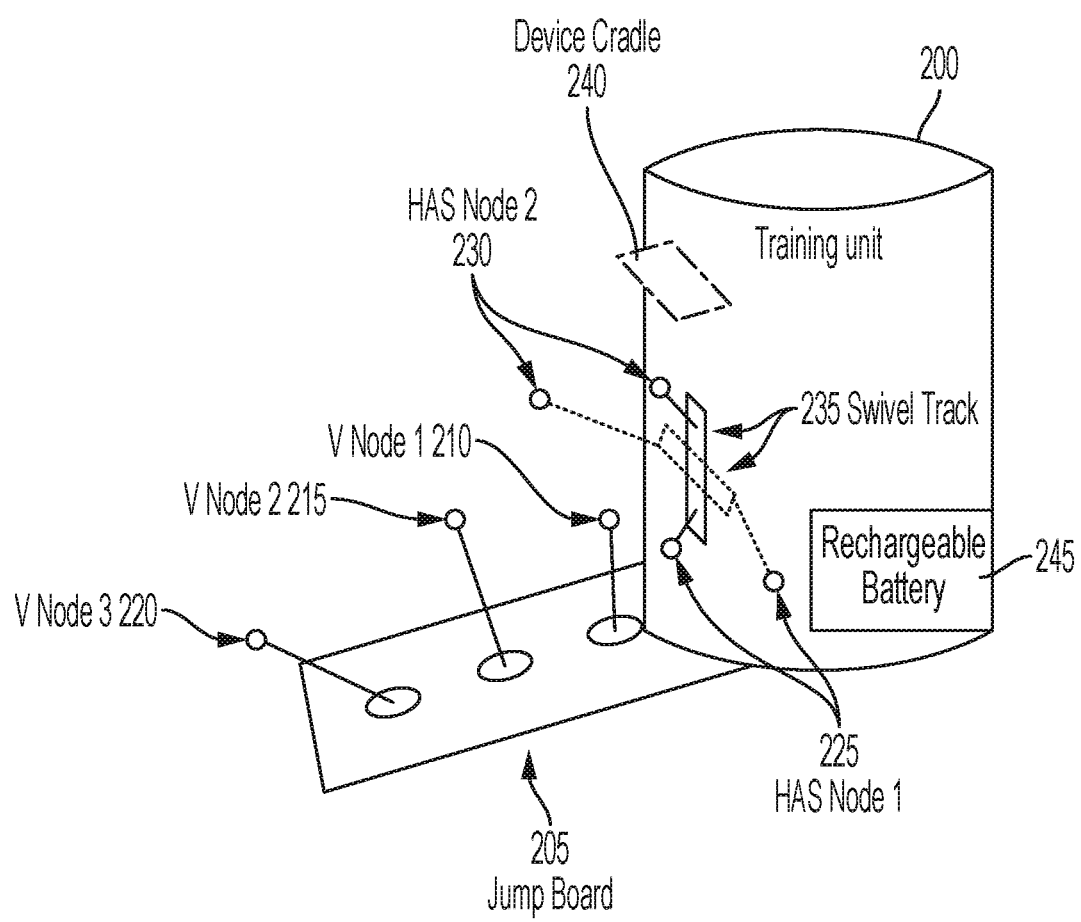
FIG. 2 depicts a single-athlete adaptation of the training unit, in accordance with an example embodiment.

A single user adaptation of a training unit 200, to be used by a single athlete at a time is illustrated in FIG. 2. The shape of the single-use unit may resemble that of the multi-athlete unit 500 (FIG. 5). However, the remaining stations will be facade in training unit 200. The training unit 200 in this example includes a single station, combining the V stations and HAS stations. The Verticality component of the device contains a jump board 205 (described in further detail in FIGS. 4(a) and 4(b)) and three V nodes 210, 215, and 220. In this example embodiment, each V node comprises a cable connected to a resistance source, which may be an electric motor, and a connection mechanism to the athlete using the device. Each V node will comprise a cable that connects to a spool inside the unit and a ring outside of the unit.

The unit also contains one HAS track 235 facing the athlete and the jump board 205, to be used for horizontality, agility, and speed training. The HAS stations are described in further detail with respect to FIG. 7. The HAS track 235 in this example includes two HAS nodes, 225 and 230. The HAS nodes 225, 230 are connected by a cable that may run to an electric motor resistance, used to adjust the resistance in the training drills. The HAS node also includes a ring 720 (FIG. 7) attached to the end of the cable to be connected to the athlete while performing drills. The HAS nodes 225, 230 may move along the HAS track 235 to provide a greater range of motion. The HAS 235 track may also rotate up to 90 degrees in order to level the nodes horizontally or vertically, thus providing an even greater range of motion.

The single-athlete device may also include a single cradle 240 that can fit a mobile device or other type of smart or IoT device. The device may also contain a rechargeable battery 245 to remove the need for the device to be plugged in at all times.

Figure 3:
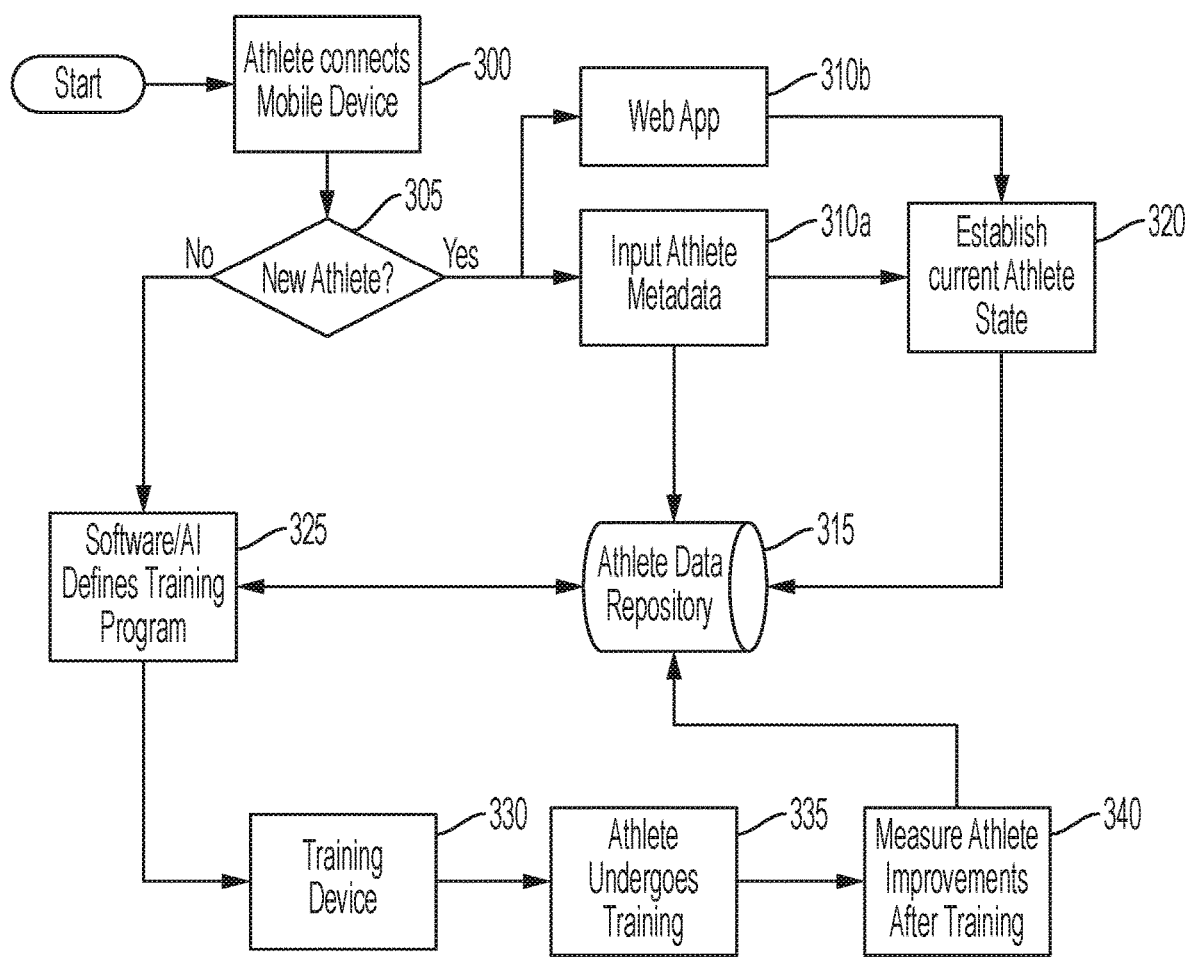
FIG. 3 depicts the process for using the training unit, in accordance with an example embodiment.

A flow process for using the training unit. 200 (FIG. 2), 500 (FIG. 5) is illustrated in FIG. 3 The process begins with a user connecting their mobile device to the training unit 300. The system checks whether the athlete has a used the training program before 305, If not, the user is direct to input their metadata and biometric data via the mobile application 310a or the web application 310b so that the computer software 125 may produce the pre-training evaluation drills 325, using unit learning, AI, or another type of computer program. Athletes will use the unit and relevant accessories such as BMI scale and oximeter to obtain data for the design of individualized training programs inclusive of rest time for conditioning gains in addition to VASH gains. The metadata and biometric data is stored in the athlete data repository 315, so that it may be queried by the computer software 125. This metadata and biometric data includes, but is not limited to, an athlete identifier, gender, age, BMI, sports they play by position, where applicable, areas they wish to improve, height, weight, standing reach, jumping reach, wingspan, and sport-specific professional association tests. Next, the new athlete must establish a baseline of their current athletic state 320. The baseline data combined with the input biometric data will be used to design a training program with personalized levels of resistance and drills progressively 325. The training program is sent to the training unit 200, 500 in step 330. Next, the new athlete completes the training 335 suggested by the computer software 125, using the training unit 330. For a new user, data collected from other athletes may be used to suggest routines. The results of the training 340 are collected by the training unit and are stored in the athlete data repository 315.

If the user has used the athletic training system 10 before, the computer software queries data from the athlete data repository 315 to specify the level of resistance, drills, and training routines for the athlete. Data used by the computer software may include past workouts from the athlete or crowdsourced data from workouts of other athletes. Once the computer software 125 has generated an athlete-specific training program, the athlete performs the drills 335 and the training unit 330 collects and records data 340 to the athlete data repository 315. Any improvements in the athlete's performance are also logged.

The computer software 125 produces training programs based on several factors. Resistance is sport-specific and athlete-specific using the profile of the athlete and all athletes training on unit, globally, including the manually input metadata. Data is collected from both the current user and is crowdsourced user data. Data collected by the training unit during the training may include but is not limited to, type 2a muscle fiber signals from the athlete, level of resistance, tension from the cables, or acceleration of the cables. The program may suggest training, resistance and non resistance and rest time programs with and without the unit based on the athlete's current and predicted future state. Resistance in the training regimen may simulate opposite force of the muscle motion, spanning from concentric to eccentric muscle motion. Resistance may also be extracted during a drill by the athlete or by sport based athletic test scores. Rest in the training regimen may vary based on the oxygen level of the athlete progressively.

Figure 4A:
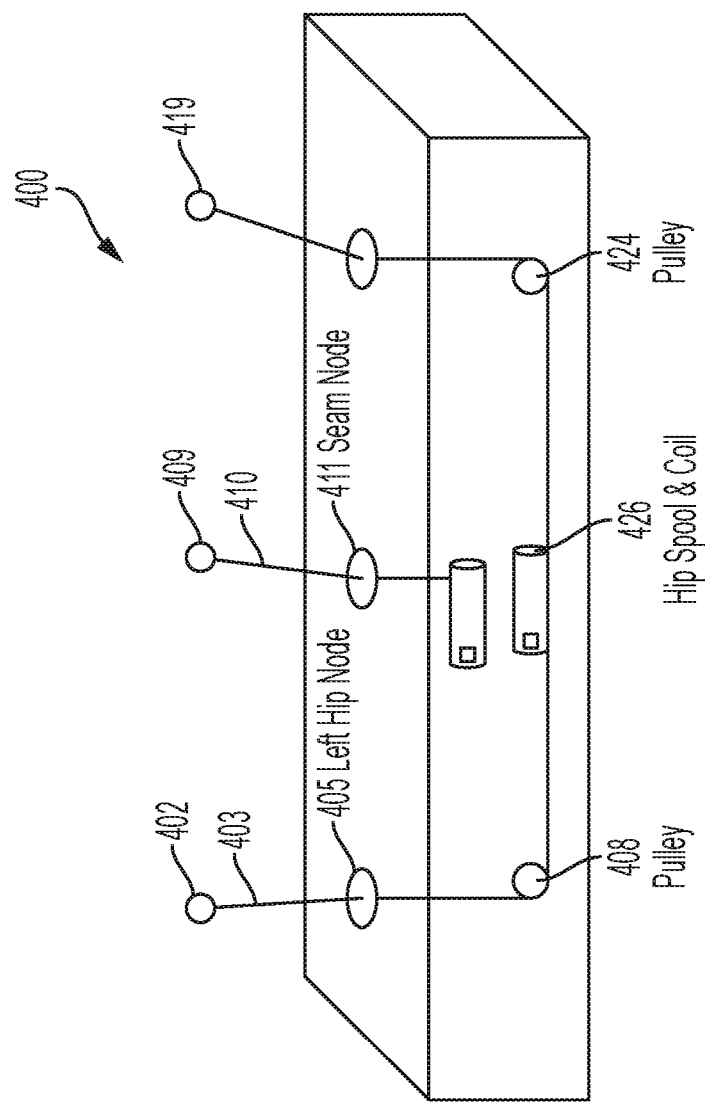
FIG. 4a depicts the composition of the jump board 400 as part of the V station, in accordance with an example embodiment.
Figure 4B:
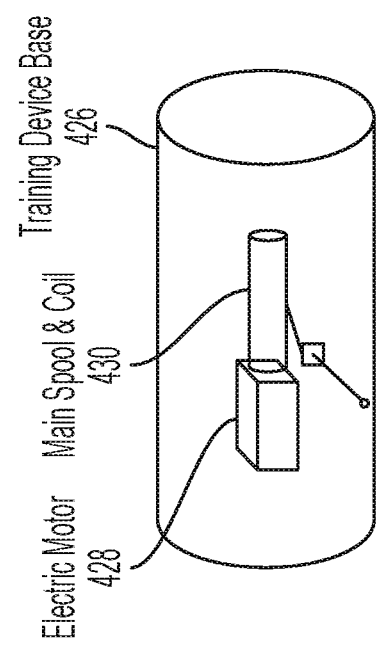
FIG. 4b depicts certain components of jump board 400 of FIG. 4a in more detail.
Figure 5:
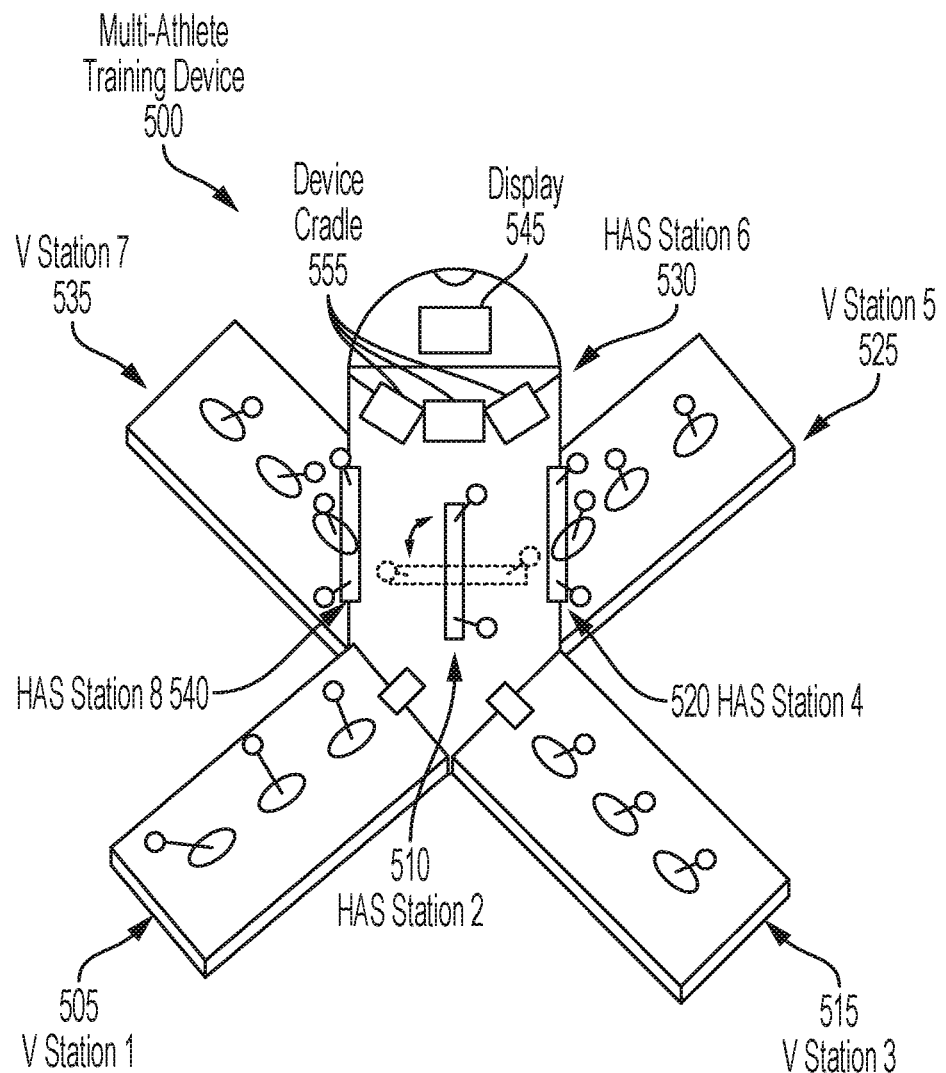
FIG. 5 depicts the training unit as it is intended for multi-athlete use, in accordance with an example embodiment.

An example of the jump board 400 included as part of the V station is illustrated in FIG. 4a. V stations are intended for use in verticality training to increase, at least, the vertical jump elevation. In the illustrated example, each jump board 400 contains three nodes, although the number may not be limited to three. The three nodes in this example are the left hip node 405, the seam node 411, and the right hip node 421. Each node contains a cable 403, 410, 420 and a ring 402, 409, 419 to be attached to the athlete performing the verticality drills. Each board also may have a swing-down flap arm with mounting brackets 429 attaching and securing the board to the main body of a training unit. This example embodiment depicts the hip nodes 405, 421 and the seam node 411 connected to individual cable spool units 426. Referring to FIG. 4*b*, the spools units include a spool 430 coupled to an electric motor 428. The spools 430 have a cable connection port to connect to the HAS node for connection to the electric motor in training device base.

The electric motor 428 in the illustrated example may be controlled or programmed to provide varying levels of resistance by depending on athlete, drill and repetition and effort or the athlete as applied in each drill to calibrate resistance adaptively. In addition, embedded systems will control the electric motor 428 which may be programmed to collect data before, during, and after training drills to improve future recommended training regimens. This may happen via the mobile device 110 getting data from training unit 100. Data from the training unit 100 maybe saved as a result into data repository 105.

Another example embodiment of the invention of a training unit 500 intended for multi-athlete use is illustrated in FIG. 5. This example embodiment depicts eight stations—four V stations and four HAS stations, although the present invention is not limited to eight stations or four of each station type. The V Stations in this diagram are V Station 1 505, V Station 3 515, V Station 5 525, and V Station 7 535. These V stations all contain jump boards 400 as described with respect to FIG. 4 and a mechanism to attach the jump boards 400 to the main body of the training unit. Each jump board may comprise a plurality of nodes. FIG. 5 illustrates three nodes on each jump board—a right hip node 421, a seam node 411, and a left hip node 405. In this embodiment, the nodes each have a cable attached to a ring that can be hooked onto an athlete while performing drills. In this example, a cable runs from the left hip node to the seam node, and from the right hip node to the seam node. Inside the training unit base there is at least one electric motor. The motor exacts tension on the cables between each node. The motor may be automated to increase or decrease the resistance based on recommendation provided by the computer software and the training unit. V stations may also contain a set of rotational nodes on the main body of the training unit that face the jump board. These nodes may swivel up to 90 degrees and move along the rail.

Between the V stations are the HAS stations. FIG. 5 illustrates HAS station 2 510, HAS station 4 520, HAS station 6 530, and HAS station 8 540. HAS station 6 in this diagram is on the back side of the training unit, and is not viewable in FIG. 5. HAS stations are used to train at least horizontality, agility, and speed in athletes using the training unit. Each HAS station contains a rail with two or more nodes. These nodes contain a ring and a cable to attach to the athlete during training. Each node or combination of nodes serves a specific purpose for training drills. These nodes may be moved up or down along the rail. Additionally, the rail may rotate up to 90 degrees to allow for greater range of motion. There may exist electric motors within the training unit that are programmed to provide a varying level of resistance to an athlete using a HAS station. HAS stations are described in further detail with respect to FIG. 7 below.

The main body of the training unit also may contain at least one display console 545, to display training drills or other information. The main body of the unit also has several cradles 550-560, corresponding to the number of training stations, to mount mobile or other IoT devices. This example embodiment depicts three cradles, but a training unit with 8 stations may have at least 8 cradles to hold mobile devices for each of the 8 athletes who concurrently use the device. The device may also contain a rechargeable battery so that the device may not always be required to be plugged into an electrical outlet.

Figure 7:
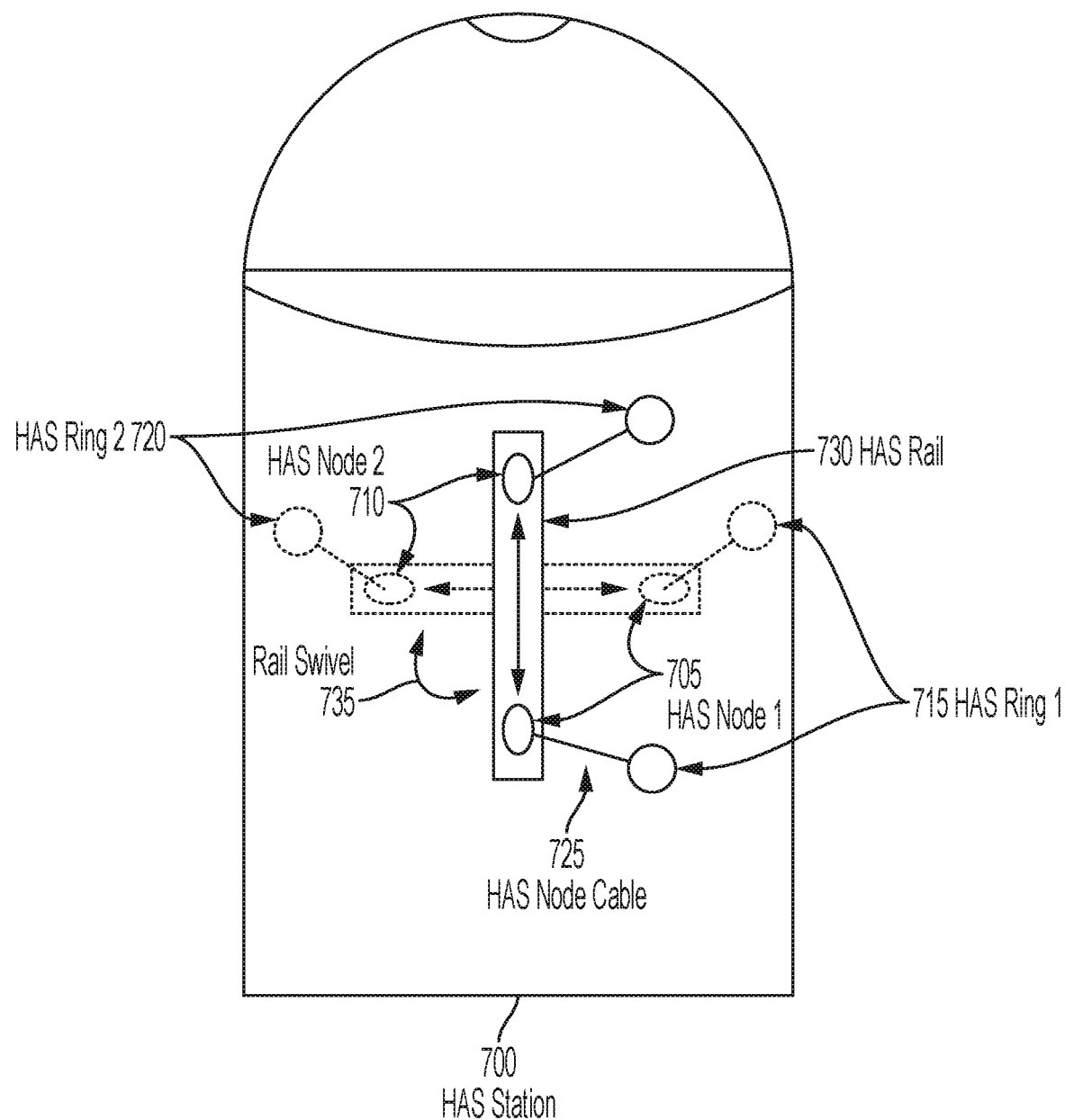
FIG. 7 depicts a HAS station, in accordance with an example embodiment.

FIG. 7 illustrates an example embodiment of a HAS station 700, to be used to improve horizontality, agility, speed, or another training area. HAS station 700 may be used for HAS stations 510, 520, 530, 540. The HAS station depicted in this example embodiment contains two nodes 705 and 710. The two nodes are connected by a HAS cable 725 which may be run an electric motor to vary the level of resistance in the training drills. Each node has a ring 715, 720 on the end of the cable, to be attached to the athlete performing the training drills. The cable may unwind and rewind at varying levels of tension depending on the level of resistance provided by the electric motor. The nodes are attached to a HAS rail and may move along the rail 730 to provide increased range of motion to an athlete performing the drills. The rail may also swivel 735 up to 90 degrees to further increase the range of motion for the athlete. This diagram also depicts logically the rail and two nodes after they have been swiveled 90 degrees.

Figure 6:
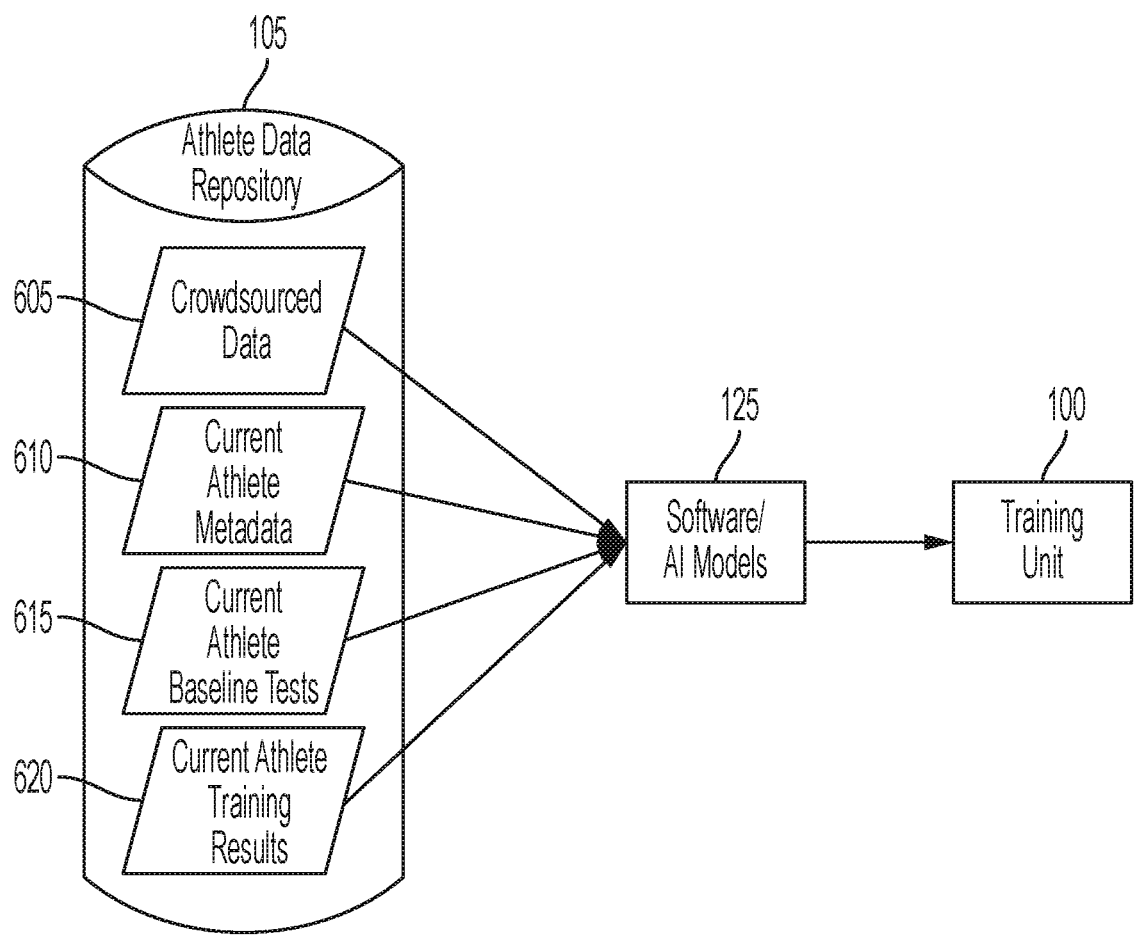
FIG. 6 depicts example database structure and the data within that may be used by computer software to predict the best training regimen for an athlete, in accordance with an example embodiment.

An example database structure, and the data within that may be used by machine learning algorithms to design the best training regimen and predict the gains by an athlete is illustrated in FIG. 6. The athlete data repository 600 may contain several tables or collections of different data, collected from different sources. The data within the athlete data repository may be used by computer software to predict the best training regimen to be used by the athlete with the training unit. The database structure may comprise, which may be cloud, SQL server, relational, or other types of database structures. The data contained in the database may be anonymized and only available to the user to which it belongs.

This example depicts four collections of data, although other sources of data may be useful to design future training regimens. Also, these sources need not be kept separate and may be combined if desired. The first data source depicted by the diagram is crowdsourced data 605. This may include training results collected manually by a human or by other training units. This may also contain data collected by the training unit from other athletes. For example, training results from other athletes would be included in this category. This data may be used to enhance training regimens for the current athlete by comparing results of other athletes with similar build, gender, age, sport, etc. Machine Learning algorithms may be developed to mine data collected from all athletes to increase the accuracy and efficacy of regimens for athletes with similar profiles to those who achieved best gains.

The next data source is the current athlete's metadata and biometric data 610. This may include, but is not limited to gender, age, BMI, sports they play, areas they wish to improve, height, weight, standing reach, jumping reach, wingspan, and sport-specific professional association. This data may be used in combination with the crowdsourced data to compare training results with other athletes with similar metadata to the current user.

The third data source in this example is the current athlete's baseline tests 615. The baseline tests may include for example initial vertical jump, broad jump, or other athletic measurement that may be collected by the training unit. This is used as a reference from which to measure any gains or to suggest areas of improvement.

The last data source in this example is the current athlete's training results 620. These results are collected to measure the increase in performance in the athlete as well as suggest further areas of improvement. The athlete's base line tests may be combined with the athlete's training results.

As described in more detail below, the four data sources in this example embodiment, as well as other sources of data, may be used by computer software 125 such as AI or a machine learning algorithm to predict future training regimens for an athlete using the training unit 630. Although these four sources of information, and others, may be collected and stored in the athlete data repository, each athlete may only have access to their own data.

The Machine Learning/Artificial Intelligence component of the adaptive athletic training system may be implemented in any number of manners known to persons of skill in the art. The following Machine Learning example is provided as an illustration of one example of Machine Learning, but the invention is not limited to this particular example.

In the example herein, multiple Machine Learning models (ML models) are developed for different uses with the adaptive athletic training system. This provides accurate prescription of training routines to each athlete, in order to meet each athlete's specific needs/goals and achieve maximum athletic gains. The routines comprise drills, resistance levels, and accessories, to be used with each optimized and individualized to a given individual athlete.

The combined goal of the machine learning models is to predict the optimal drill routine and resistance levels for each drill in order to maximize performance gains for each athlete and sport. There may be multiple machine learning models employed, each focused on a different aspect of a personal training program.

In some embodiments, a ML model is developed to create an individualized training routine to each athlete who signs up for an adaptive training program. This is done for each training session over the duration of the training period that the athlete selected. Drill routines should be individualized to improve athlete performance in the four VASH areas as applicable to an individual athlete's sport. Routine customization should primarily focus on areas the user has prioritized, secondarily on areas of importance to the user's sport, and finally focus on improving the areas of weakness identified by the user's evaluation session. Areas of weakness include isolating a single leg as well and more generally VASH areas that the user scored below where what would be expected. Routines in each training session will consist of resisted sets for concentric and eccentric resistance levels, while athlete is connected, non resisted sets, while athlete is not connected and rest time. The adaptive training programs will sequence the drills and calibrate resistance for coil and recoil and rest time based athlete's training performance and heart rate.

In some embodiments, a ML model is developed to individualized resistance level to each drill that is optimized according to the athlete's biometric data and evaluation results. An athlete who scores lower than expected based on their biometric data in the verticality tests would receive lower initial resistance on verticality drills. After the system collects more training data on the athlete, the system can optimize resistance levels for a specific drill, since it is known how an athlete performed the last time they took the drill.

In some embodiments, a ML model is developed to individualize specific accessories to an athlete according to bio data and evaluation results. Some athletes may not be tall enough to use a certain height of plyometric box or hurdle or may or may not be strong enough to lift a heavier medicine ball. For this reason, training routines include individualized accessories for an athlete for the applicable drills. Initially the model predicts the accessory the athlete should use based on their test results and their bio data. Similarly to resistance prediction, the model can adjust and optimize accessory prescription when it has more training data on the athlete, and thus have a better modeling of how the athlete performs with the accessory.

In one example, five ML models are employed. The models described herein may be combined or further specialized into more models. Greater or fewer ML models may be used, and ML models may be added as more training data becomes available as users begin to use the training units. Each of the above examples and the ML models discussed herein may be used separately or in combination with each other.

As the adaptive athletic training system 10 collects more data, the machine learning will become increasingly more powerful.

The first ML model is a Predict Combine Scores model. This model predicts the result of an evaluation test based on user metadata and biometric data ("profile data"). The output of this model can be used to identify the areas of weakness for a user by comparing predicted scores and actual scores.

The Predict Combine Scores model inputs the user's profile data including age, gender, height, weight, BMI, sport, position, and the test for which the result is to predicted. Additional inputs include the user's biometric information. The output of the model is the predicted result for the current user on the input test. Optionally, the type of evaluation (evaluate, appraise, verify) may be included as an input to better predict results. The output of this model can have multiple useful applications. First, by predicting test results for a user and comparing them to actual results, the system can identify areas of weakness in the 4 areas (VASH). These areas of weakness can then be input to a second model, which recommends drills. Secondly, identifying weaknesses in the 4 areas (VASH) can be used as an input to a third model, which predicts optimal resistance level for drills.

A second ML model is a Drill Routine Prediction model. This model predicts drills that will maximize gains for a user in the areas they selected as goals, as well as the weakness areas identified from their evaluation scores in the first Predict Combine Scores model.

The Drill Routine Prediction model inputs evaluation results for a user and uses model 1 "Predict Combine Scores" to input the predicted evaluation results. Additionally, athlete selected goals are input. The actual results are transformed into an average percentage below (or above) the predicted results for each of the four areas of measure. These percentages can be used in conjunction with the user selected goals and the importance of each area to the athlete's sport to predict drills for an upcoming session.

The output of the Drill Routine Prediction model is a list of drills to be completed by the user for the next training session. Currently, these drills would be stored in the User Training Plan Table, but in the future Machine Learning may be run and stored locally on the user's mobile device. The mobile device would interface with the training units and give drill instructions to the machine and user.

A third ML model is an Initial Drill Resistance Prediction model. If an athlete does not have any drill results stored in the athlete data repository, the system will not have data concerning resistance levels where the athlete had struggled or succeeded. Therefore, a machine learning model is provided to predict an optimal initial resistance level.

This Initial Drill Resistance Prediction model inputs the user's profile data including age, gender, height, weight, BMI, standing reach, sport, position, and the drill for which the resistance is predicted. In addition, since drills are linked to areas of measure (VASH), the Initial Drill Resistance Prediction model can use the first model's "Predict Combine Scores" output to determine the percentage below or above predicted for a given areas the user is. Then, the Initial Drill Resistance Prediction model can scale resistance appropriately by the percentage below or above and provide that as an output. For example, say the Initial Drill Resistance Prediction ML model predicts a user's resistance for max jumps (a verticality drill) based on their profile data should be 15 pounds. However, say the user scored 20% below on average from the predicted results for verticality tests. Then, the Initial Drill Resistance Prediction ML model may scale the 15 pounds of predicted resistance down by 20% to 12 pounds.

Outputs of the Initial Drill Resistance Prediction model would not necessarily be used to input to other models per se, but the results of the user's training based on the outputs of this model can be used as an input to a new model.

A fourth ML model is a Predict Recursive Resistance model. After the first time an athlete takes a drill, the system will have more data on how the user responds to the resistance levels. The system can use this information to better optimize resistance levels in the future.

For example, after the first time an athlete completes a drill, the system will have more information on whether the resistance was too strong or to weak. First, the system can track the time between each repetition. If the repetitions are equally spaced, the system can predict that the resistance was too low. Conversely, if the user takes long breaks between reps, the system can infer the resistance is too high. Second, if applicable, we would use sensors to track applied muscle force. This would give a more precise view of the user's fatigue. Either set of data could be accurately measured with a LOESS curve, and the LOESS prediction of the last repetition could be used as an input to the fourth machine learning model.

The output of this model would simply be used to more accurately optimize the resistance level for a particular drill, and feed the resistance level to the device and the mobile app.

A fifth ML model is a Predict Accessory Configuration model. The system preferably is able to predict the optimal accessories for an athlete who takes drills that require an accessory (i.e. three hurdle shuffle). Not only do certain athletes not have the right body type for some accessories, but they may also not have scored highly enough on certain tests to be able to use an accessory. For example, it would not be desirable for an athlete who is 4 feet tall to be using a 2-foot plyometric box. The athlete simply would not be tall enough. Similarly, it would not be desirable for an athlete with a standing jump reach below 2 feet to be using a 2-foot plyometric box.

This model inputs the user's profile data including age, gender, height, weight, wingspan, standing reach, hand and palm size, foot size, waist and seam lengths, BMI, sport, position, and the relevant drill for which the accessory is predicted. The model outputs a reasonable accessory configuration for the current athlete and drill. The output of this model will be the accessory configuration for the applicable drill. For example, an output could be "6 lb. medicine ball".

In some embodiments constraints to drills, resistance, and accessories based on an athlete's biometric data and test results are included. If a Machine Learning model outputs a result that is outside of these constraints, the system may adjust the output so that it stays within the constrained values. For example, say a ML model predicts 40 pounds of resistance for a 12-year-old athlete for the drill "ski jumps". However, the system may have been configured to constrain resistance to between 5 and 30 pounds for 12-year old athletes performing "ski jumps". The system would roll back the resistance from 40 to 30 lbs. Other constraints may also be implemented for other exercises, athlete categories, etc.

In some embodiments, a regression neural network may be used to implement machine learning models. This type of model is well suited to the adaptive athletic training system as the inputs are a mix of numeric and categorical variables. However, other algorithms like boosted decision tree regression may also be suitable. Also, there are many robust supervised regression models that could serve the same purpose.

The variables input to predict a user's score for a given test may include but are not limited to the following: age, gender, ethnicity, height, weight, standing reach, wing span, sport, sport position, and drill. Sport Position is the sport position of the athlete that the athlete indicated at the beginning of their training program. This may be implemented as a single variable, and not two separate ones for sport and position. This is because a football wide receiver is likely to score differently than a football lineman. Additionally, it is not sufficient to include only the position as there may be a difference between a basketball center and a hockey center. Instead, this variable is input as the unique identifier of the sport and position. For example, id 1=football Wide receiver, id 2=football lineman, id 3=basketball center, id 4=hockey center etc. Drill is the drill or test for which the system is predicting a result for the athlete. The output of the model is a Predicted Result—the result for the input test given the user's biometrics.

One example of how to create an ML model corresponding to the Predict Combine Scores ML model is provided below. This and other techniques may be used to train the various ML models.

In order to train a Machine Learning model, the training data is typically compiled into a single table that to be input to a machine learning algorithm. However, the relevant data may be stored in many different normalized database tables. These tables may be joined, extracting the relevant data and discarding the irrelevant data.

Once the training dataset is compiled, the relevant biometric data may be associated with each test and result. This may be done by extracting an athlete's GUID (globally unique identifier, used to identify a user across all tables) and use it to filter the dataset, extracting only the evaluation results for that athlete. Then all evaluation results for that athlete that comprise stored biodata like height, weight, standing reach, wingspan, oxygen level, or body fat % are extracted.

Evaluation tests and results are matched to the bio data that was closest to the date that the current evaluation test was taken. For example, if an athlete completed "Broad Jump" on Feb. 20, 2019, but did not measure their height on that date, the system could examine other dates their height was measured. Additionally, the system can interpolate biometric data between two measurement dates. Various existing algorithms may be used to clean data (also known as imputation).

Different algorithms may be chosen for different variables based on data type and function of the variable. Additionally, for missing values that might depend on other variables, a probabilistic cleaning algorithm like "Multivariate Imputation using Chained Equations" (MICE) or "Probabilistic Principal Component Analysis" (PCA) could be used. For example, it is reasonable to assume that standing reach is roughly correlated to a combination of height and wingspan, so the system can probabilistically infer a missing standing reach from the current row's height and wingspan values, if they exist.

The Predict Combine Scores model requires a supervised machine learning algorithm. Supervised machine learning is when inputs are mapped to an output space, and the model is trained with labelled inputs and outputs to specify to the model the desired output based on collected inputs.

Additionally, this requires a regression model, rather than a classification model. Classification implies that the range of outputs is discrete and finite, and the only possible outputs are ones we have labelled for the model. Regression on the other hand may have a continuous output space. For example, if we have two athletes who scored 2 seconds and 3 seconds respectively on the 47-foot sprint, it is entirely possible that the model could predict a third user to score 4 seconds. The difference is that classification deals with categorical outputs while regression deals with numeric outputs.

It is typical when training a ML model to split the dataset in two, creating a dataset to train the model with, and a second dataset to test and score (validate) the model. In addition to providing a way to test how well the model performs, a test set also prevents "overfitting" the model where datapoints that are perhaps outliers are learned as rules by the model.

For example, a data set may be split into 80% of the rows for the training set and 20% for the test set. If the data set is large, a 70-30 split may be a better split. Rows may be selected randomly, by taking the top 80% of rows, or by another method.

When training a machine learning algorithm, the inputs are typically scaled so that they are all weighted equally. For example, without scaling, a weight of 150 would have more impact than an age of 12, since 150 is a much bigger number. To solve this, each variable is scaled from 0 to 1. There are a variety of methods to scale the features by, including normalizing, scaling uniformly, or putting the features into bins.

Each neural network requires user input to select the number of hidden layers and nodes as a parameter in the algorithm. There is not a single "right answer" to the number of hidden layers and nodes. For example, a first neural network could be implemented with 12 hidden nodes, and a second could be implemented with 15 hidden nodes, and they could work equally well. Likewise, there are other neural network parameters that may be specifically tuned. If a different regression algorithm is used, the types of parameters may change. For example, there is no such thing as hidden nodes in "Random Forest Regression".

An initial configuration tuned according to a small training set of data may include the following parameters. The parameters may include Hidden Nodes—100; Learning Rate—0.005; Learning Iterations—100; Initial Learning Weight—0.15; and Normalizer—Min/Max Normalization. For the reasons provided above, this example is provided for completeness of disclosure, not to limit the invention. These parameters may be modified to account for the quality and quantity of data in the system.

Depending on the type of model that is used, it may be necessary to tune the model after it has been scored. For example, with models like Random Forest Regression, it may be necessary to complete a process called "cross validation" that tunes the model, predicting parameters based on how the current statistical analysis would perform against an independent data set. This process also reduces overfitting. However, the process is not applicable for some regression algorithms.

Once a model is trained, the test dataset is used to score it, and determine how it performs. The data from the test set (in this example, age, gender, ethnicity, test, etc.) is input and an output test result is generated by the model. Then, how the model performed can be evaluated. Common methods for determining effectiveness of a model are the coefficient of determination, which is also referred to as R2, Root Mean Squared Error (RMSE), or other statistical quantifiers. If these scores are below where hypothesized, it may be necessary to retrain the model with different inputs or algorithm parameters.

Once the model is trained, an Application Programming Interface (API) may be developed and used to predict future athlete test results based on the biometric data collected from them. The results of this model will be stored along with other user information and can be used as an input to additional machine learning or predictive analytic models.

The training units will capture and rely on sport-specific performance tests including standing jumping reach, running jumping reach, two-leg horizontal bound, right and left legs horizontal bounds, right and left legs side-step jumps, right and left legs step-back jumps, five-yard right and left lateral shuffle, five-yard forward and backward sprints, forty-yard dash and seventy-five foot sprints. For example, in basketball, an athlete executes a side-step jump shot. The training unit may include a test to measure the current-state pre-training span of an athlete's best side-step jump. The jump will simulate the exact move where improvement is sought. The training unit measures the athlete's span. The training unit will exact a training routine, which will include components and the full motion, to increase the athlete's side-step span. After a specified period of training and completing the entire custom designed training program for the athlete, the athlete will be re-tested to verify the gains.

The training unit is designed to improve athletic performance in at least four specific areas, including Verticality, Agility, Speed, and Horizontality. First, the unit improves verticality using drills like standing vertical jumps, right-leg and left-leg running jumps, and two-leg running jumps. The unit also allows for improvement in horizontality using drills like right-leg, left-leg, and two-leg horizontal bounds, also known as broad jumps. The unit provides measurable increases in agility though drills such as lateral sprints in both left and right directions. Finally, the unit improves speed with forward or backward sprints. The athlete performs these drills by hooking themselves to cables attached to the unit, which provide athlete specific resistance necessary to perform the drills and improve their skills.

Between the V stations are the HAS stations, each containing a rail with two or more nodes. These nodes contain a ring and a cable to attach to the athlete during training. These nodes may be moved up or down along the rail. Each node or combination of nodes serves a specific purpose for training drills. The main body of the unit also contains at least one display console. The main body of the unit also has several cradles, corresponding to the number of training stations, to mount mobile or other IoT devices.

What is claimed is:

1. An athletic training system comprising:
an athlete data repository including biometric and performance data of athletes;
a processing system configured to:
execute one or more trained artificial intelligence adaptive algorithms to generate a plurality of athlete-specific training programs for use with training units, wherein the one or more trained artificial intelligence adaptive algorithms have access to the athlete data repository, wherein the one or more trained artificial intelligence adaptive algorithms are trained on biometric and performance data stored in the athlete data repository, and wherein each athlete-specific training program is adapted to biometric and performance data of an individual athlete;
receive profile data and baseline data of a user, wherein the profile data comprises an age of the user, a gender of the user, a height of the user, a weight of the user, a sport of the user, a sport position of the user, and wherein the baseline data comprises results of the user from evaluation tests; and
provide the profile data and the baseline data to the one or more trained artificial intelligence adaptive algorithms to generate an athlete-specific training program for the user;
a mobile device comprising an application stored thereon, wherein the mobile device, when executing the application, is configured to receive the athlete-specific training program for the user from the processing system;
a training unit comprising:
a cradle structured to hold the mobile device;
a horizontal-agility-speed station comprising a cable, a ring on an end of the cable to be attached to athletes, and an electric motor connected to the cable, wherein the electric motor adjusts resistance levels of the cable;
a jump board for verticality training; and
a controller configured to:
connect to the mobile device via a Wi-Fi connection;
receive, from the mobile device via the Wi-Fi connection, the athlete-specific training program for the user;
adjust resistance levels applied by the electric motor to the cable in response to the received athlete-specific training program for the user; and
collect and record performance data of the user's use of the training unit in accordance with the received athlete-specific training program for the user.

2. The athletic training system of claim 1, wherein the training unit further comprises an interface for coupling to the mobile device of the user, and wherein the mobile device, when executing the application and coupled to the interface, is configured to transmit the athlete-specific training program to the training unit.

3. The athletic training system of claim 2, wherein:
the controller is configured to communicate the performance data to the mobile device; and
the processing system is configured to receive the performance data from the mobile device and provide the performance data to the one or more trained artificial intelligence adaptive algorithms.

4. The athletic training system of claim 1, wherein the processing system is configured to communicate the performance data to the athlete data repository.

5. The athletic training system of claim 1, wherein the one or more trained artificial intelligence adaptive algorithms comprise a plurality of trained artificial intelligence adaptive algorithms.

6. The athletic training system of claim 1, wherein the one or more trained artificial intelligence adaptive algorithms comprise a plurality of Machine Learning models.

7. The athletic training system of claim 6, wherein the plurality of Machine Learning models comprises an evaluation prediction model which receives as input biometric data for a given athlete and performance data of other athletes, and generates an evaluation training program.

8. The athletic training system of claim 7, wherein the plurality of Machine Learning models further comprises a drill routine model which receives as input performance data recorded by the controller during use of a previously generated evaluation training program.

9. The athletic training system of claim 8, wherein the drill routine model receives as input the performance data recorded by the controller during use of an athlete-specific training program generated by the drill routine model.

10. The athletic training system of claim 1, wherein the training unit further comprises a plurality of vertical jump stations and a plurality of horizontal-agility-speed stations.

11. The athletic training system of claim 1, wherein the processing system is configured to, when executing the one or more trained artificial intelligence adaptive algorithms, provide the one or more trained artificial intelligence adaptive algorithms access to biometric information and performance data of a given athlete to generate an athlete-specific training program for that athlete.

12. A method of generating an athlete-specific training program adapted to an individual athlete comprising:
receiving, using a processing system and from a mobile device, profile data and baseline data of a user, wherein the profile data comprises an age of the user, a gender of the user, a height of the user, a weight of the user, a sport of the user, a sport position of the user, and wherein the baseline data comprises results of the user from evaluation tests;
storing, using the processing system, the profile data and the baseline data of the user in an athlete data repository;
providing a training unit comprising:
a cradle structured to hold the mobile device;
a horizontal-agility-speed station comprising a cable, a ring on an end of the cable to be attached to athletes, and an electric motor connected to the cable, wherein the electric motor adjusts resistance levels of the cable;
a jump board for verticality training; and
a controller configured to:
connect to mobile devices via Wi-Fi connections;
receive, from the mobile devices via the Wi-Fi connections, athlete-specific training programs for users;
adjust resistance levels applied by the electric motor to the cable in response to the athlete-specific training programs, and
collect and record performance data of the users' use of the training unit in accordance with the athlete-specific training programs;
positioning the mobile device in the cradle of the training unit;
providing, using the mobile device, an identifier for the user and an identifier for the training unit to the processing system;

providing, using the processing system the identifier for the user and the identifier for the training unit to one or more trained artificial intelligence adaptive algorithms trained to generate a plurality of athlete-specific training programs for use with training units, wherein the one or more trained artificial intelligence adaptive algorithms are trained on biometric and performance data stored in the athlete data repository;

generating, using the processing system and the one or more trained artificial intelligence adaptive algorithms, the profile data, the baseline data, and the athlete data repository, an athlete-specific training program for the user;

providing, using the process system, the athlete-specific training program for the user to the mobile device;

receiving, using the mobile device, the athlete-specific training program for the user;

connecting, using the controller of the training unit and via a Wi-Fi connection, the training unit to the mobile device;

providing, using the mobile device and via the Wi-Fi connection, the athlete-specific training program for the user to the training unit;

receiving, using the controller of the training unit and via the Wi-Fi connection, the athlete-specific training program for the user;

adjusting, using the controller of the training unit, the resistance levels applied by the electric motor to the cable in response to the received athlete-specific training program for the user; and collecting and recording, using the controller of the training unit, performance data of the user's use of the training unit in accordance with the received athlete-specific training program for the user.

13. The method of generating an athlete-specific training program of claim 12, wherein the training unit further comprises an interface for coupling to the mobile device of the user, wherein the method comprises:

coupling the mobile device to the interface of the training unit, and when providing the identifier for the user and the identifier for the training unit to the processing system and when providing the athlete-specific training program for the user to the training unit, providing the identifier for the user and the identifier for the training unit to the processing system and providing the athlete-specific training program for the user to the training unit, while the mobile device is coupled to the interface of the training unit.

14. The method of generating an athlete-specific training program of claim 13, further comprising:

receiving, with the mobile device, the performance data recorded by the controller, and communicating, with the mobile device, the performance data to the one or more trained artificial intelligence adaptive algorithms.

15. The method of generating an athlete-specific training program of claim 12, wherein the one or more trained artificial intelligence adaptive algorithms comprise a plurality of Machine Learning models.

16. The method of generating an athlete-specific training program of claim 12, comprising accessing, with the one or more trained artificial intelligence adaptive algorithms, the profile data of the user and the baseline data of the user to generate the athlete-specific training program for the user.

17. The athletic training system of claim 1, wherein the processing system is configured to execute the one or more trained artificial intelligence adaptive algorithms to determine an accessory configuration for the user for the athlete-specific training program.

18. The athletic training system of claim 1, wherein the horizontal-agility-speed station comprises:

a rail; and a node comprising the cable and the ring, wherein the node is configured to be moved along the rail.

* * * * *